Dec. 2, 1930.  J. D. COX  1,783,496
POTATO GRADING MACHINE
Filed May 4, 1926  2 Sheets-Sheet 1

Inventor
James D. Cox
By Frederick G. Kluge
Attorneys

Dec. 2, 1930.  J. D. COX  1,783,496
POTATO GRADING MACHINE
Filed May 4, 1926  2 Sheets-Sheet 2
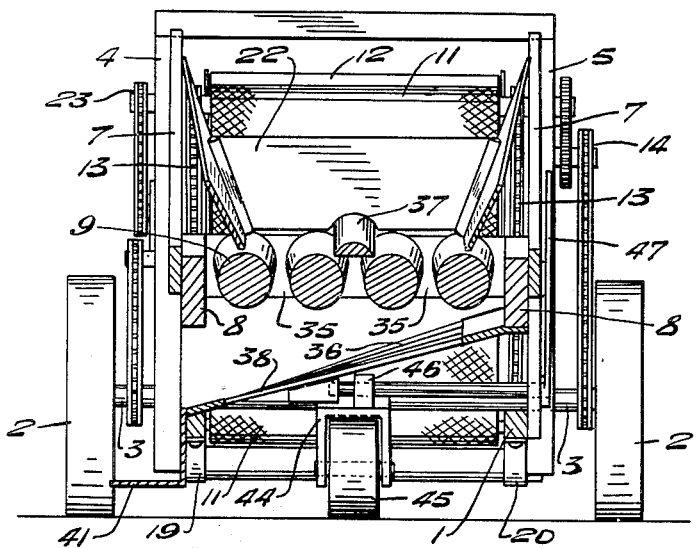
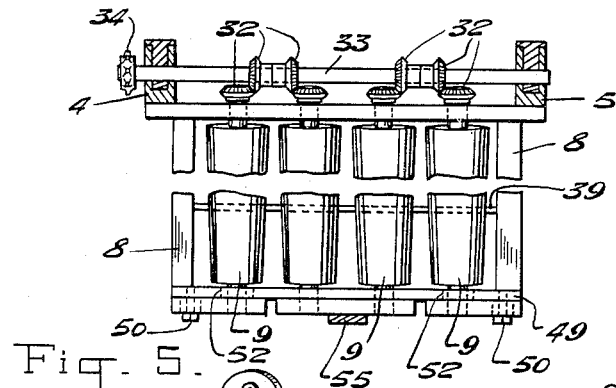
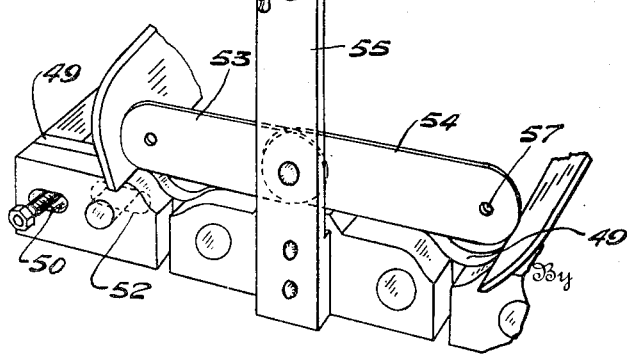
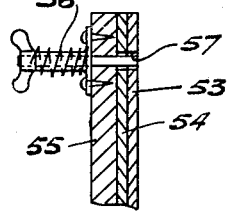
Inventor
James D. Cox
Frederick A. Klinge
Attorneys Patented Dec. 2, 1930

1,783,496

UNITED STATES PATENT OFFICE

JAMES D. COX, OF CAPE MAY, NEW JERSEY

POTATO-GRADING MACHINE

Application filed May 4, 1926. Serial No. 106,692.

This invention relates to agricultural machinery, and particularly to apparatus for gathering potatoes or similar vegetables as they are discharged from the digger, automatically freeing them from vines, trash clods, dirt etc., grading them according to size and depositing them properly graded into suitably arranged baskets or other receptacles.

One of the objects of the invention is the provision of a device in which gravity is utilized for distributing the potatoes along the grading means.

Another object of the invention is to provide for adjusting the inclination of the grading means according to the slope of the land, in order to secure the proper effect of gravity in distributing the potatoes.

Still another object of the invention is to provide means for cutting off the flow of potatoes without stopping the mechanism, when it is desired to change baskets.

A further object of the invention is to construct a combined potato gatherer and grader including a conveyer or flight receiving potatoes from a gathering rack and delivering them to grading rolls, the gathering rack being supported in yieldable resilient cradles so as to rise over obstructions on the ground, and being pivotally mounted adjacent the lower end of the conveyer in such manner as to be in operative relation thereto regardless of the rise and fall of the gathering rack.

Other objects of the invention will appear as the following description of an illustrating embodiment thereof proceeds.

In the drawings:—

Fig. 3 is a section taken along the line 3—3 of Fig. 1.

Fig. 4 is a plan view showing the arrangement of the grading rollers.

Fig. 5 is an end view, in perspective showing the tail-gate mechanism.

Fig. 6 is a section through a portion of the tail-gate mechanism showing the holding means.

Figure 1:
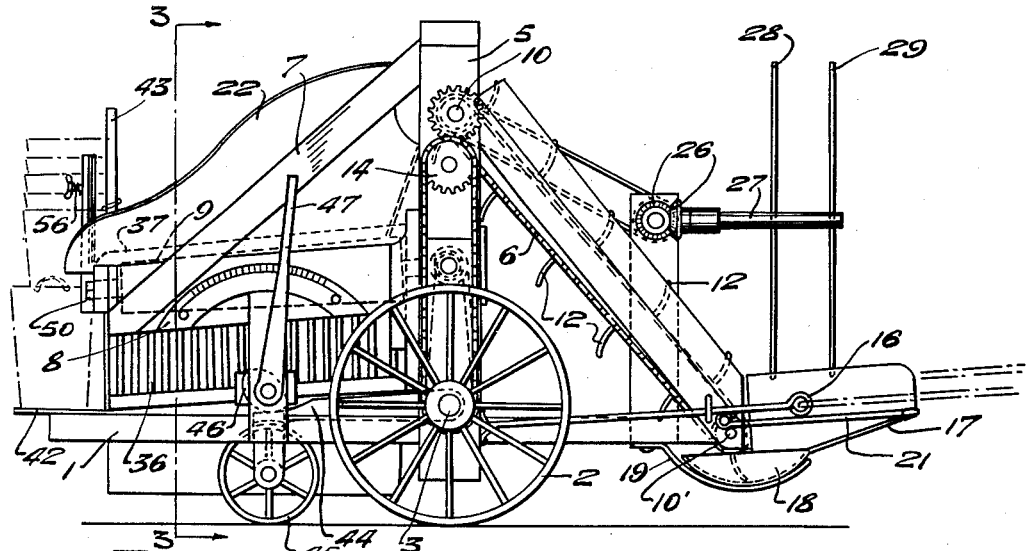
Fig. 1 is a side elevation of my improved potato gatherer and grader.
Figure 2:
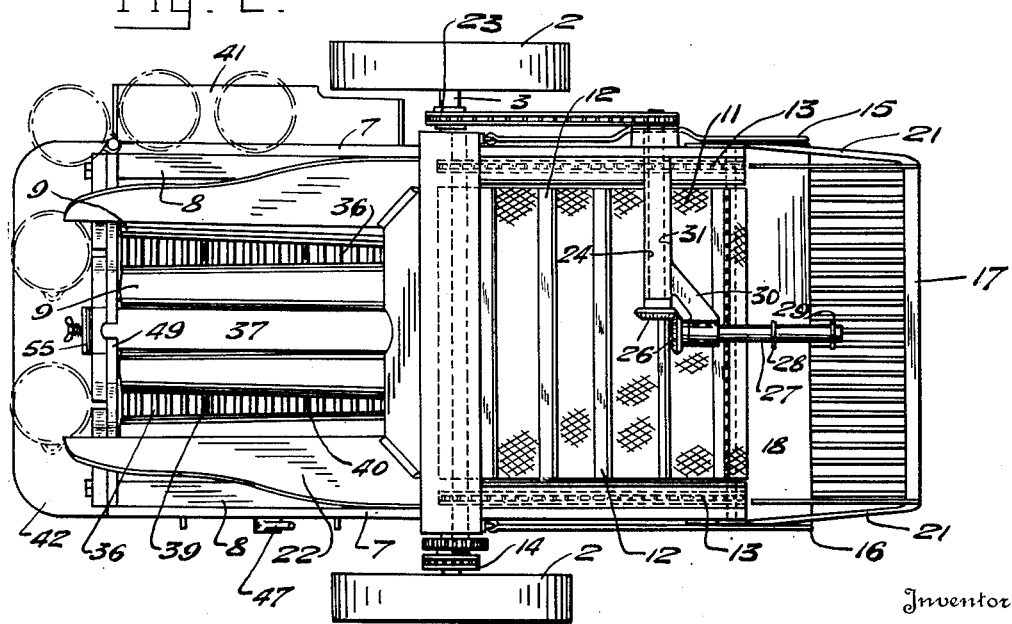
Fig. 2 is a plan view.

Referring now in detail to the several figures, the numeral 1 represents a vehicle body supported by vehicle wheels 2 mounted upon an axle 3, at least one of said wheels being fixed to the axle. The axle is placed near a line passing through the center of gravity of said body, the latter being fairly evenly balanced upon the axle, so that the elevation of either end may be accomplished with but little expenditure of effort. Upright members 4 and 5 are carried by the body 1 at an intermediate part thereof affording support, on the one side, for a conveyer 6 and on the other, for the diagonal members 7 which support the outer end of the frame 8 carrying the grading rollers 9. The conveyer includes upper and lower shafts 10 and 10' about which passes an endless belt 11 formed of reticulated material and transected by cleats 12 forming flights or pockets in which the potatoes are retained and carried to the top of the conveyer. The ends of the cleats project beyond the reticulated material, and are secured to endless chains 13 traversing sprockets on the shafts 10 and 10', by which means the endless belt is driven through power imparted to the shaft 10 by the sprocket 14 which is chain driven from the vehicle axle, the tractive force of the wheel against the ground being relied upon for motive power. It is to be understood of course, that a motor or other prime source of power may be used without violating the spirit of the invention.

The potato gatherer and grader is designed to be drawn behind a potato digger, not shown, and for this purpose means for applying draft is provided in the form of eyed rods 15 and 16 pivotally secured to a fixed part of the apparatus.

A gathering rack 17 is provided adjacent the lower end of the conveyer, the purpose of which is to receive potatoes delivered to it from the digger. The rack includes a trough 18 having a barred grating at its advanced edge upon which the potatoes are first dumped by the digger, the clods falling between the bars and the potatoes being retained, said potatoes rolling into the trough 18.

The gathering rack is carried by spring cradles 19 and 20 which permit the gathering rack to rise and fall with the inequalities of the ground over which the apparatus is drawn. The gathering rack is, however, pivotally mounted adjacent the lower end of the conveyer by means of the radius rods 21 so that regardless of its position of elevation, it is always within operative proximity to the conveyer. Rotary rakes 28 and 29 traverse the path of the potatoes on the conveyer in a transverse direction, for ridding the potatoes of vines, roots or other stringy substances. The rakes are mounted on a stub shaft 27, from a stub shaft 24 to which power is transmitted by a sprocket 23 on the upper shaft 9 of the conveyer. The stub shaft 27 is supported by a bracket 30 emanating from a stationary casing 31 surrounding the stub shaft 24 and carried by an upright member 25. While the potatoes are en route upon the conveyer, the small particles of dirt which accompanies them shift through the reticulated fabric of the conveyer so that the potatoes are clean when discharged into the hopper 22.

The grading device to which the potatoes are delivered from the conveyer comprises the frame 8 carrying pairs of cooperating rollers 9 the same constituting the bottom of the hopper 22. The rollers are mounted on axes arranged longitudinally of the vehicle and the rollers of a pair are reversely driven as shown in Fig. 4 by bevel gear sets 32 driven through a transverse shaft 33 having a sprocket 34 operatively connected to the vehicle axle.

In the illustrative embodiment of the invention there are two pairs of grading rollers although this number is by no means limitative. The rollers which are frusto-conical in form have their smaller ends directed toward the rear of the apparatus and are spaced apart so as to define between them a slot or passage-way of increasing width, as it approaches the rear. The direction of rotation of the rollers of a pair is preferably upward from the slot so that the potatoes are merely agitated by the rotation of the rollers and not forced through the slot. The rollers 9 normally inclined downwardly toward the rear so that the larger potatoes travel longitudinally of the rollers during their agitation the smallest of the potatoes dropping through the passages 35 adjacent the upper ends of the rollers where said passages are narrowest, potatoes of a slightly larger size dropping through said passages toward the rear, while the largest sized potatoes do not drop through the passages at all but gravitate to the lower ends of the rollers, falling over the end member 49 of the frame which is suitably recessed for this purpose. Since the direction of rotation of the proximate rollers of the adjacent pairs is such that it would forcibly squeeze the potatoes through said rollers, mashing them, the guard 37 is placed above the space between said rollers to exclude the potatoes.

A sloping floor 38 preferably formed of spaced bars 36 is provided beneath the grading rollers, opening to one side of the machine. This floor is provided with vertical partitions 39 and 40 forming chutes by means of which the potatoes falling through between the rollers are segregated into several grades which may be collected in baskets suitably placed at the mouths of the chutes. A shelf 41 is provided upon which the baskets may rest. The largest potatoes, that is to say, those which overflow the ends of the rollers are caught in baskets placed upon the shelf 42. The post 43 is intended to carry extra baskets as is indicated in Fig. 1.

It is frequently necessary to operate the apparatus upon a hillside, the slope of which may alter the inclination of the grading rollers to such an extent that the potatoes are fed along either too fast or too slow. It may also happen that vegetables of a more round shape than potatoes are being graded, which will travel along the rollers faster than potatoes. In either event, it is desirable to have means for adjusting the inclination of the rollers to the most advantageous position. This is done, according to the present invention, by tilting the body of the machine, the following instrumentalities being employed. An arm 44 is swingably mounted upon the axle, extending rearwardly and carrying a ground-engaging roller 45. Between said arm and the floor of the grader a cam 46 is suitably supported, the same being rotatable about a horizontal axis in order to increase or decrease the space between said arm and body of the apparatus, thereby tilting the latter and so adjusting the inclination of the rollers. The cam is controlled by a lever 47 cooperating with a toothed segment 48.

The space between the rollers of each pair may be varied in width by adjusting the outer rollers to or from the inner rollers. Provision for this adjustment is made by journalling the ends of said outer rollers in blocks which are slidable laterally along the end member 49 of the frame. The blocks are secured in adjusted position by suitable means such as threaded studs 50 fixed to the end frame member 49 and passing through slots in the blocks. Nuts on said studs bear against the blocks and afford means for retaining the adjustment. The end frame member is slotted, as indicated at 52 in Fig. 5 to permit lateral shifting of the rollers.

In general, the adjustment is so determined as to let the culls and smaller sized potatoes slip through into the appropriate chutes, while the bulk of the potatoes overflow the ends of the rollers. It consequently becomes necessary to change the end baskets quite frequently. Means are therefore provided to cut off the flow of potatoes over the end frame member, when desired, consisting of tail gates 53 and 54 pivotally mounted on a vertical member 55, centrally arranged, and adapted to be held in normal inoperative position against said upright by the spring-projected bolt 56 operating in apertures 57 in the tail gates. When the end baskets are to be changed, the bolt 56 is withdrawn permitting the tail gates to be lowered. Should it be desired to fill but one end basket at a time, either of the tail gates may be selectively lowered.

While I have in the above description disclosed what I believe to be a preferred and practical embodiment of my invention, it is to be understood that the specific details described are not limitative in their effect upon the invention, but merely illustrative, except in so far as they are expressly prescribed by the terms of the appended claims.

Having described my invention what I claim as new and desire to secure by Letters Patent, is:—

1. In a potato gathering and grading machine, a vehicle, cooperating rollers carried longitudinally thereof having their axes in a plane inclined downwardly toward the rear of said vehicle of frusto-conical formation to form intervening spaces between the rollers diverging toward the discharge end of the rollers for passage of potatoes, means for variably adjusting the relative angularity of the axes of said rollers to increase or decrease the divergency of said passage, means for altering the inclination of their axes and means for cutting off at will at selected points the flow of potatoes over the ends of said rollers, said means including an upright support and tail gates both of which are pivoted at their adjacent ends to said upright support.

2. In a potato gathering and grading machine, a vehicle, a hopper carried thereby, a conveyer adapted to receive potatoes from a digger, and delivering them to the hopper, rollers at the bottom of said hopper arranged longitudinally of the vehicle and spaced apart to form a passage for potatoes, and means for tilting the vehicle to incline the rollers, more or less, longitudinally.

3. In a potato gathering and grading machine, a vehicle, a hopper carried thereby, a conveyer adapted to receive potatoes from a digger and delivering them to the hopper, rollers at the bottom of the hopper arranged longitudinally of the vehicle and normally inclined downwardly toward the rear, said rollers being spaced apart toward the rear to form a passage for potatoes, an auxiliary vehicle wheel, means swingably supporting said wheel beneath said vehicle and a cam between said wheel carrying means and the body of said vehicle for tilting the latter, altering the degree of inclination of said rollers.

4. In a potato gathering and grading machine, comprising a vehicle, a hopper carried thereby, grading means operatively positioned with respect to said hopper, and a conveyer for feeding potatoes to said hopper; a rack, forming a receiving end for said conveyer, and pivotally secured to said conveyer.

5. In a potato gathering and grading machine, comprising a vehicle, a hopper carried thereby, grading means operatively positioned with respect to said hopper, and a conveyer for feeding potatoes to said hopper; a rack, forming a receiving end for said conveyer, said rack being pivotally secured to said conveyer, and springs forming cradles by which said rack is yieldably supported.

6. In a potato gathering and grading machine, a vehicle, a hopper carried thereby, a frame beneath said hopper, downwardly inclined toward the rear, pairs of rollers carried longitudinally by said frame, an upright member at the rear of said hopper, tail-gates pivotally mounted and selectively operable to cut off the flow of potatoes over the ends of said rollers on either side of said upright member, and means carried by said upright member for holding said tail-gates in inoperative position.

In testimony whereof I affix my signature.

JAMES D. COX.